United States Patent Office 3,068,944
Patented Dec. 18, 1962

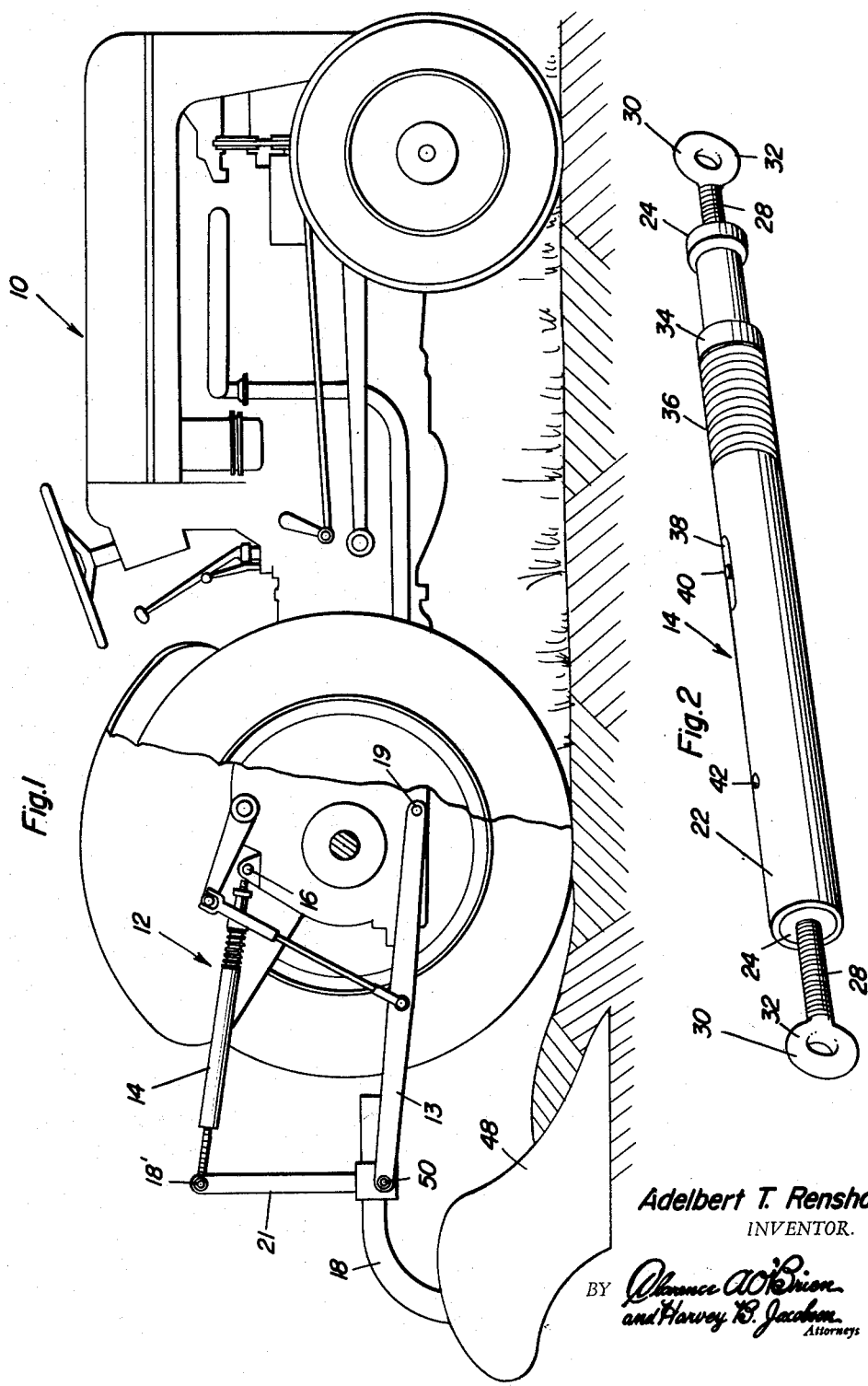

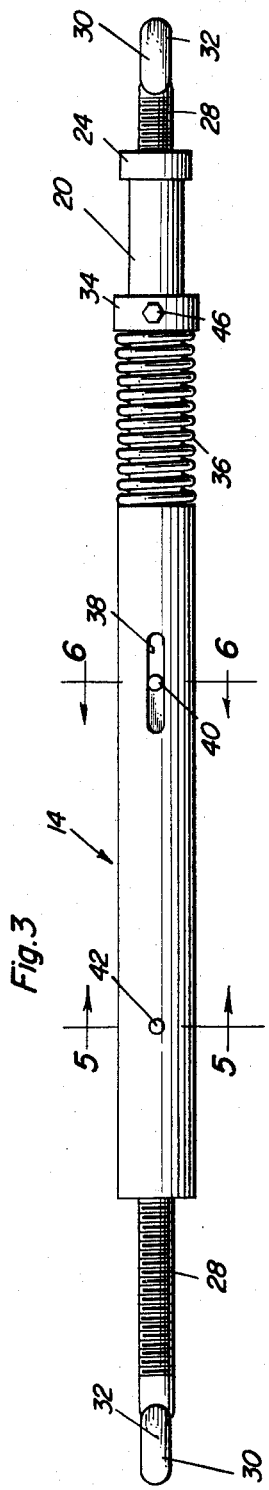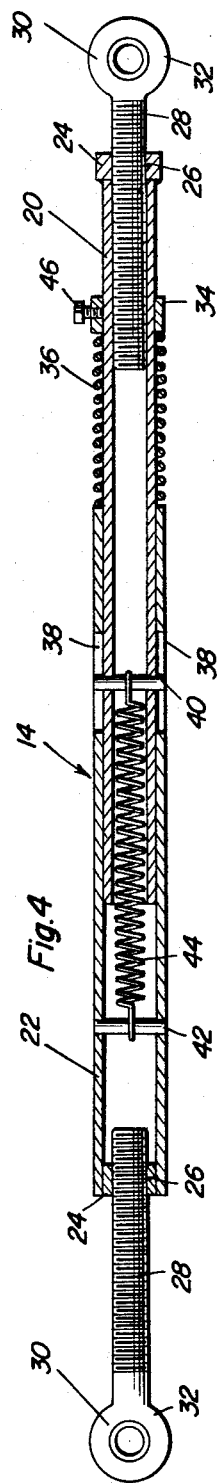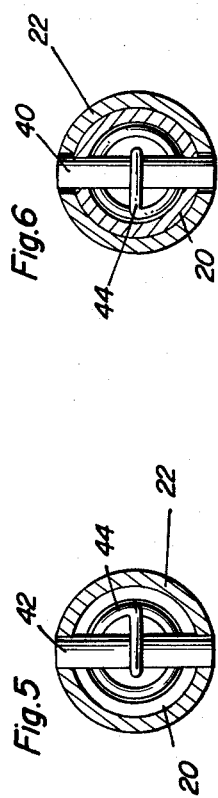
Adelbert T. Renshaw
INVENTOR.

3,068,944
TELESCOPING UPPER COMPRESSION ARM FOR A THREE-ARM TRACTOR LIFTING HITCH
Adelbert T. Renshaw, Ash Grove, Mo.; Lee K. Renshaw and J. W. Renshaw, executors of Adelbert T. Renshaw, deceased
Filed Feb. 12, 1960, Ser. No. 8,305
7 Claims. (Cl. 172—449)

This invention relates to a novel and useful telescoping upper compression arm for a three-arm tractor lifting hitch, and more particularly to an upper compression arm which is adapted to resiliently expand and contract as the thrust required to pull a draft implement secured to the lifting hitch is reduced and increased.

With the conventional form of three-arm tractor lifting hitch, when the lifting mechanism for the hitch is positioned as desired, the hitch becomes substantially rigidly secured to the tractor and therefore as the forward end of the tractor is raised the hitch extending beyond the rear end of the tractor is lowered causing the bite of a draft implement to become deeper. Alternately, if the forward end of a tractor is lowered with respect to its rear end, the lifting hitch is raised and the bite of the draft implement carried by the lifting hitch is reduced.

Rough terrain as well as plowing across furrows can cause a tractor to pivot about a transversely extending axis which will effect the raising and lowering of a draft implement carried by the lifting hitch secured to the rear of the tractor.

It is the main object of this invention to provide an upper compression arm for a three-arm tractor lifting hitch which will compensate for the pivoting of a tractor about an axis extending transversely thereof so that the draft implement being carried by the lifting hitch will maintain its proper relationship relative to the ground with which it is engaged.

A further object of this invention, in accordance with the immediately preceding object, is to provide an upper compression arm including two telescoping sections which are resiliently urged against contraction and extension so that as the tractor to which the lifting hitch is secured rotates about an axis extending transversely thereof, the upper compression arm will contract and extend as needed to compensate for the changing inclination of the tractor.

A final object to be specifically enumerated herein is to provide an upper compression arm for a three-arm tractor lifting hitch in accordance with the preceding objects which will conform to conventional forms of manufacture, be of simple construction and automatic in its operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a tractor having a three-arm tractor lifting hitch secured to the rear end of the tractor of which three-arm tractor lifting hitch the upper compression arm of the instant invention comprises a part thereof;

FIGURE 2 is a perspective of the upper compression arm comprising the present invention;

FIGURE 3 is a top plan view of the upper compression arm;

FIGURE 4 is a horizontal longitudinal sectional view of the upper compression arm shown in FIGURE 3 taken substantially upon a plane passing through its longitudinal center line;

FIGURE 5 is a transverse vertical sectional view on somewhat of an enlarged scale taken substantially upon the plane indicated by the section line 5—5 of FIGURE 3; and FIGURE 6 is a transverse vertical sectional view on somewhat of an enlarged scale taken substantially upon the plane indicated by the section line 6—6 of FIGURE 3.

Referring now more specifically to the drawings, the numeral 10 generally designates a tractor having a three-arm tractor lifting hitch generally referred to by the reference numeral 12 secured to the rear end thereof. The upper compression arm of the instant invention is generally designated by the reference numeral 14 and is pivotally secured to the tractor 10 at its forward end by means of a transverse pivot pin 16 and to the upper end of a connecting arm 21 of the implement 18, at its rear end, by a transverse pivot pin 18'. The lower arms 13 are each pivotally secured to the tractor 10 at their forward ends as at 19 and to the implement 18 by means of a transverse pivot shaft 50.

The compression arm 14 includes a cylindrical forward section designated by the reference numeral 20 and a cylindrical rear section designated by the reference numeral 22. The front and rear sections 20 and 22 are each hollow (see FIGURE 4) and the front section 20 is slidably disposed within the rear section 22. The front and rear sections 20 and 22 are each provided with end plates 24 which are fixedly secured to their remote ends. The end plates 24 are provided with threaded longitudinally extending bores 26. The threaded shank portions 28 of a pair of connecting elements referred to by the reference numerals 30 are threadedly engaged in the bores 26 and are provided with suitable eyes 32 on their remote ends for a purpose to be hereinafter more fully set forth. The forward section 20 has a stop collar 34 secured thereto adjacent the outer end thereof and a compression spring 36 is disposed about the front section 20 and between the stop collar 34 and the adjacent end of the rear or outer section 22. Thus, the compression spring 36 resiliently urges the opposite ends of the sections 22 and 20 away from each other.

A pair of diametrically opposed slots 38 are formed through the outer section 22 in the end portion thereof remote from its outer end, and a transverse pin 40 is secured through the inner section 20 and has its opposite ends slidably disposed in the slots 38.

A transverse pin 42 is secured to the outer end portion of the outer section 22 and an expansion spring 44 has its opposite ends engaged with the transverse pins 40 and 42. It will be noted that the compression spring 36 and the expansion spring 44 are both stressed and that the compression arm 14 normally assumes an intermediate length between its maximum extension position and its maximum contracted position. Further, it is to be noted that the stop collar 34 is slidably disposed upon the inner section 20 and that it is secured in adjusted longitudinal position therealong by means of a setscrew 46. Thus, upon movement of the stop collar 34 longitudinally of the inner section 20, the stressing of the springs 36 and 44 may be simultaneously adjusted. In addition, the opposite ends of the slots 38 formed in the outer section 22 comprise limits for the contraction and extension of the compression arm 14.

The eyes 32 are adapted to rotatably receive the transverse pins 16 and 20 to secure the compression arm 14 to an existing three-arm tractor lifting hitch such as that generally designated by the reference numeral 12.

In operation, the compression arm 14 is a part of lifting hitch 12 and it will be noted that if the tractor 10 is pivoted about an axis extending transversely thereof the additional rearward thrust of the plow 48 comprising a part of the draft implement 18 would tend to pivot the implement 18 about the transverse pivot shaft 50 resulting in the compression or contraction of the compression arm 14. As the compression arm 14 is contracted, the depth of the plow 48 is reduced. Further, if the plow 48 was to strike a hard object, the compression arm 14 would contract thereby causing the plow 48 of the implement 18 to be raised to pass over the obstruction.

It is to be noted that the threads formed on one of the threaded shank portions 28 will be right-handed and that the threads formed on the other threaded shank portion 28 will be right-handed. In this manner, should the inner and outer sections 20 and 22 rotate simultaneously relative to the connecting elements 30, the overall length of the compression arm 14 will not be changed. Therefore, inasmuch as the inner and outer sections 20 and 22 are secured together against relative rotation, once the eyes 32 have been secured to the tractor 10 and the implement 18, the normal over-all length of the compression arm 14 will remain constant.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use with a three-arm tractor lifting hitch of the type including two rearwardly projecting lower hitch arms and an upper upwardly rearwardly projecting hitch arm with said upper and lower arms pivotally secured at their forward ends to lower and upper portions respectively of a tractor for movement about transversely extending horizontal axes and to the lower and upper portions respectively of a draft implement at their rear ends; a replacement upper compression arm, said upper compression arm comprising a cylindrical front section and a cylindrical rear section, one of said sections being hollow and the other section being slidably disposed in said one section for relative longitudinal sliding movement therewith, first means secured between said sections resiliently urging said sections toward an extended position and second resilient means secured between said sections resiliently urging said sections toward a contracted position whereby said sections will normally assume an intermediate position relative to each other and resiliently resist extension or contraction from said intermediate position, the remote ends of said front and rear sections each having a longitudinally extending threaded bore formed therein, threaded eye-type connecting means threadedly engaged in the bore formed in said front section and adapted for pivotal securement to said tractor and threaded eye-type connecting means threadedly engaged in the bore formed in said rear section and adapted for pivotal securement to the upper portion of said draft implement whereby the normal over-all length of said compression arm may be adjusted, and means securing said sections together against relative rotation, the threads on one of said connecting means being right-handed and the threads on the other connecting means being right-handed thereby preventing extension or retraction of said sections upon their simultaneous rotation relative to said connecting means.

2. The combination of claim 1 wherein said sections each includes a cylindrical sleeve, said sleeves having end plates on their remote ends, said bores being formed in said end plates, said connecting means each including a threaded shank portion threadedly engaged in the corresponding bore.

3. The combination of claim 2 including a stop collar adjustably secured to the end of the inner section remote from the outer section for adjustable positioning along said inner section, said first resilient means including a compression spring disposed about said inner section with one end engaging said stop collar and the other end engaging the adjacent end of said outer section.

4. The combination of claim 1 wherein said sections each includes a cylindrical sleeve, said sleeves having end plates on their remote ends, said bores being formed in said end plates, said connecting means each including a threaded shank portion threadedly engaged in the corresponding bore, said second resilient means including an expansion spring secured between the end portion of the inner section remote from said stop collar and the end portion of the outer section remote from said compression spring.

5. The combination of the claim 1 wherein said sections each includes a cylindrical sleeve, said sleeves having end plates on their remote ends, said bores being formed in said end plates, said connecting means each including a threaded shank portion threadedly engaged in the corresponding bore, a stop collar secured to the end of the inner section remote from the outer section, said first resilient means including a compression spring disposed about said inner section with one end engaging said stop collar and the other end engaging the adjacent end of said outer section, said second resilient means including an expansion spring secured between the end portion of said inner section remote from said stop collar and the end portion of said outer section remote from said compression spring.

6. The combination of claim 1 wherein said means for securing said sections together against relative rotation comprises diametrically opposed slots formed in the outer section and transversely extending pin secured through the inner section with its opposite ends slidably received in said slots.

7. The combination of claim 6 wherein the end of said expansion spring adjacent the outer end of said inner section is secured to said transverse pin.

References Cited in the file of this patent

UNITED STATES PATENTS

| 1,850,310 | Ainslie | Mar. 22, 1932 |
| 2,405,980 | Sands et al. | Aug. 20, 1946 |
| 2,738,847 | Tomik et al. | Mar. 20, 1956 |

FOREIGN PATENTS

| 513,101 | Great Britain | Oct. 3, 1939 |